United States Patent
Seffens et al.

(10) Patent No.: US 6,811,022 B2
(45) Date of Patent: Nov. 2, 2004

(54) LOG TRANSPORT SYSTEM

(75) Inventors: David E. Seffens, Niceville, FL (US); Michael C. Ballard, Niceville, FL (US); David R. Shald, Pensacola, FL (US); David C. Seffens, Holt, FL (US); Jeffery T. Ramsey, Crestview, FL (US)

(73) Assignee: Advanced Sawmill Machinery, Inc., Holt, FL (US)

( * ) Notice: Subject to any disclaimer, the term of this patent is extended or adjusted under 35 U.S.C. 154(b) by 73 days.

(21) Appl. No.: 10/288,143

(22) Filed: Nov. 5, 2002

(65) Prior Publication Data

US 2004/0084281 A1 May 6, 2004

(51) Int. Cl.⁷ .............................................. B65G 15/44
(52) U.S. Cl. .................... 198/698; 198/823; 198/836.1; 198/836.4
(58) Field of Search ................................. 198/620, 698, 198/822, 823, 836.1, 836.4; 144/245.1, 245.2, 253.9, 253.91

(56) References Cited

U.S. PATENT DOCUMENTS

| | | | | |
|---|---|---|---|---|
| 3,722,343 A | * | 3/1973 | Cornell | 83/422 |
| 4,298,043 A | * | 11/1981 | Seffens | 144/136.1 |
| 4,869,303 A | * | 9/1989 | Nunnery et al. | 144/195.1 |
| 4,886,156 A | * | 12/1989 | Records et al. | 198/692 |
| 5,217,106 A | * | 6/1993 | Bunney | 198/463.5 |
| 5,373,878 A | * | 12/1994 | Walker | 144/250.16 |
| 5,685,410 A | * | 11/1997 | Ritola et al. | 198/457.06 |
| 5,918,653 A | | 7/1999 | Knerr | |
| 6,220,423 B1 | * | 4/2001 | Gagnon et al. | 198/460.1 |
| 6,394,259 B1 | * | 5/2002 | Alhainen | 198/692 |
| 6,644,164 B1 | * | 11/2003 | Stroud | 83/811 |

OTHER PUBLICATIONS

PME Consulting, Inc.; Mechanical Specifications Log Processing Area Equipment; Nov. 6, 2001; 26 pgs.

* cited by examiner

*Primary Examiner*—Douglas Hess
(74) *Attorney, Agent, or Firm*—Alston & Bird LLP

(57) ABSTRACT

A system for lineally transporting logs, lugs therefor, and an associated method are provided. The system includes first and second tracks that are machined and connected to a frame to provide continuous track surfaces. The first track, which is formed of portions that are keyed to the frame, defines a nonlinear cross section. Lugs having support surfaces that correspond to the track surfaces are configured to be driven longitudinally along the tracks, and the nonlinear contour of the first track prevents the lugs from moving transversely. The track portions are machined to define track surfaces, and the first track portions are keyed to the frame so that the first track portions are substantially collinear and the first track surface is uniform and continuous in the longitudinal direction of the track, thereby reducing transverse motion of the log during transport.

30 Claims, 11 Drawing Sheets

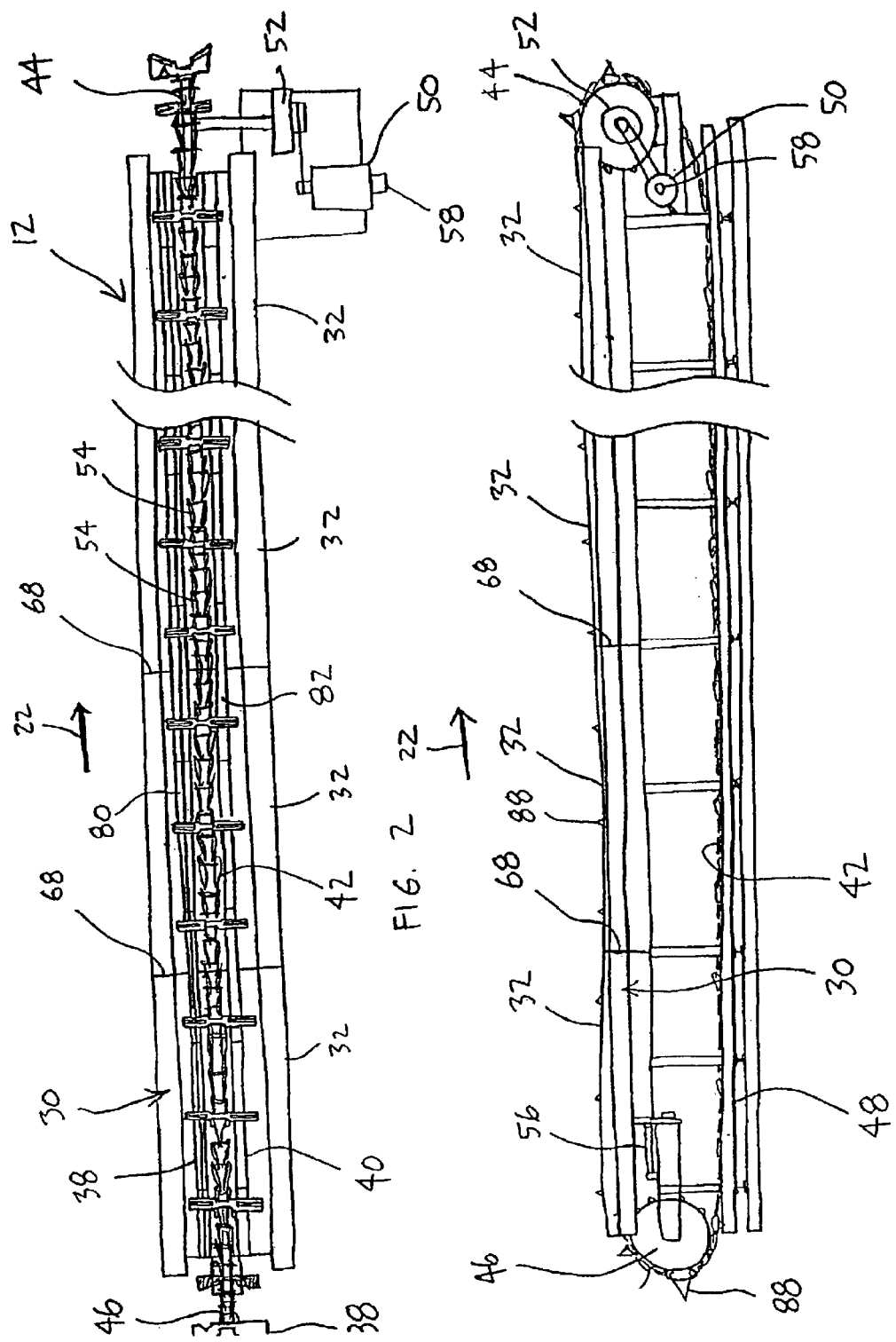

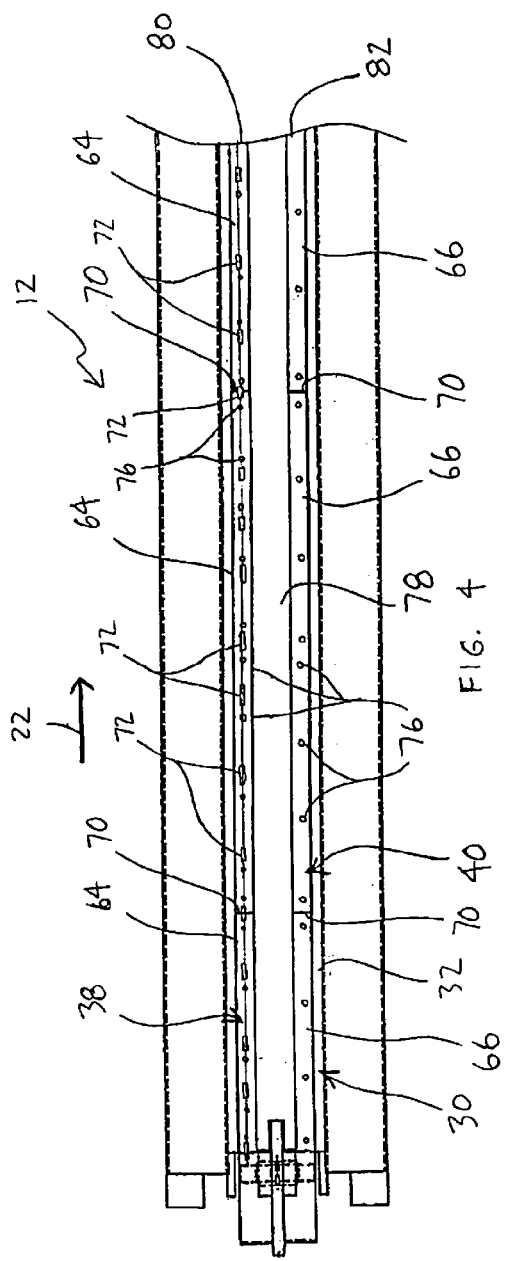
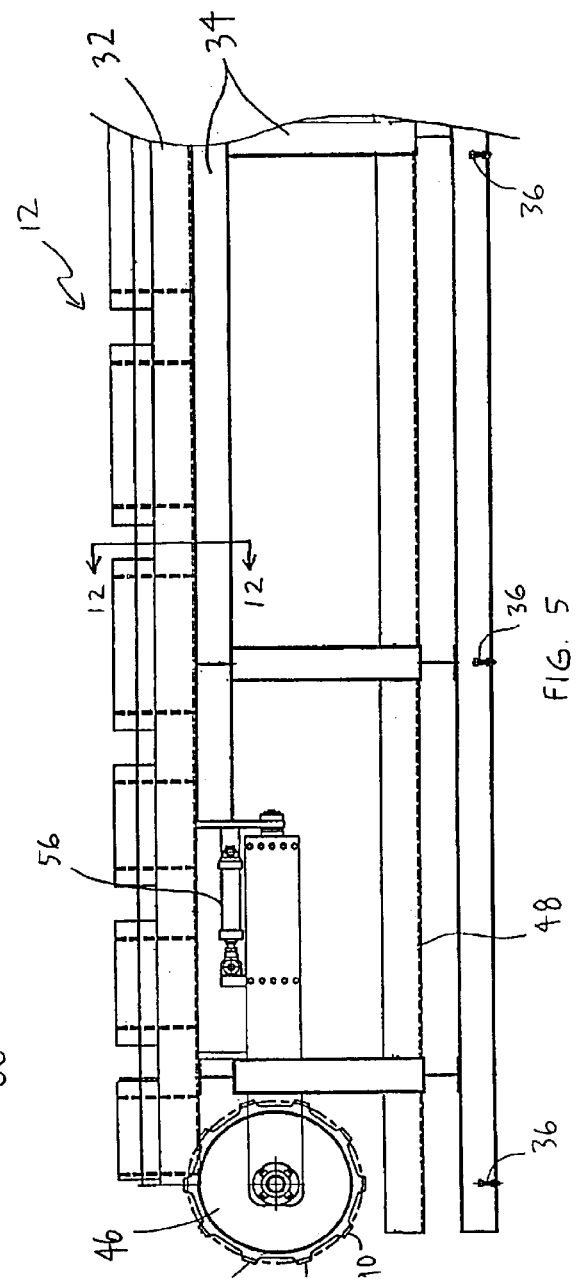

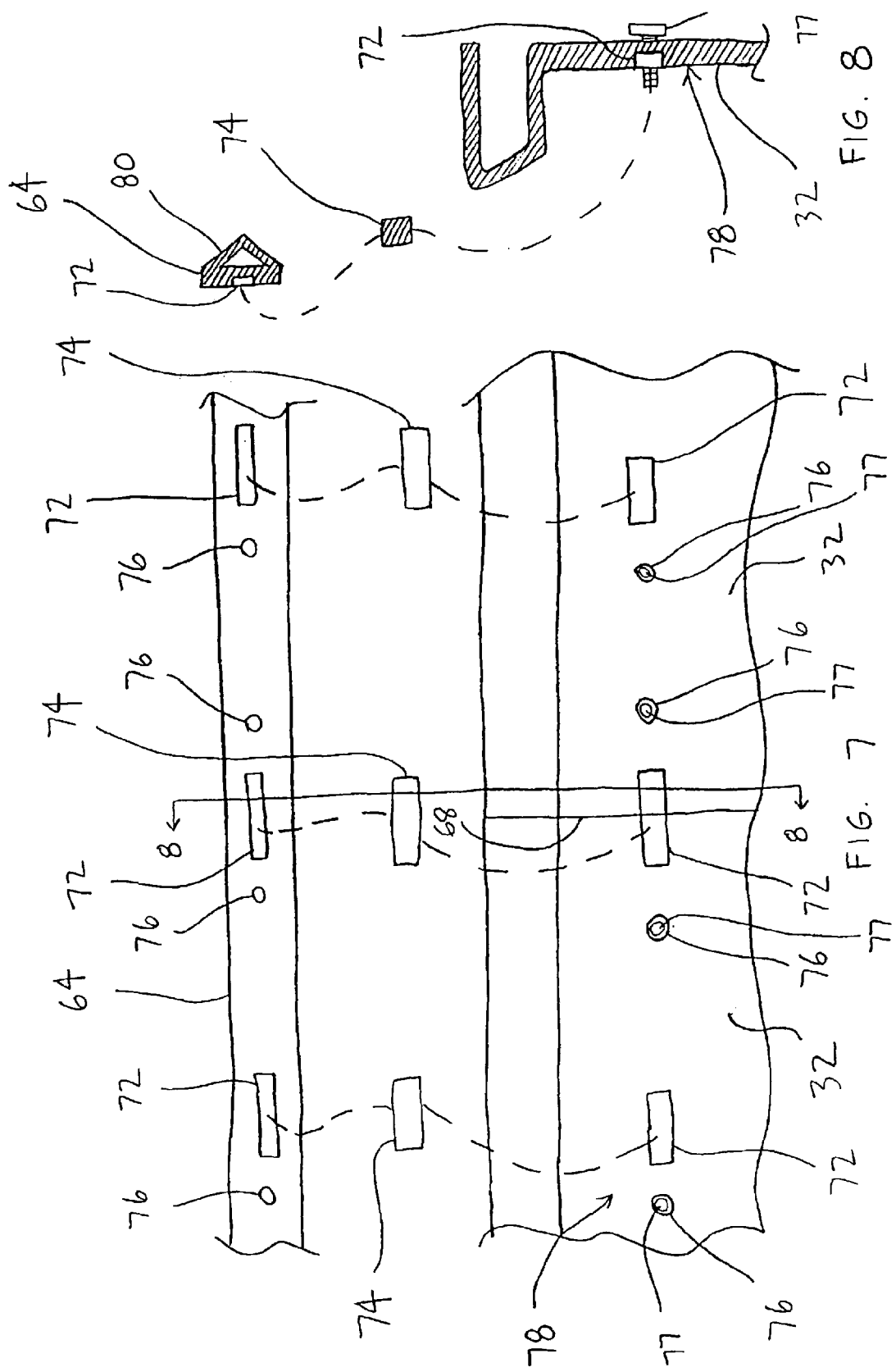

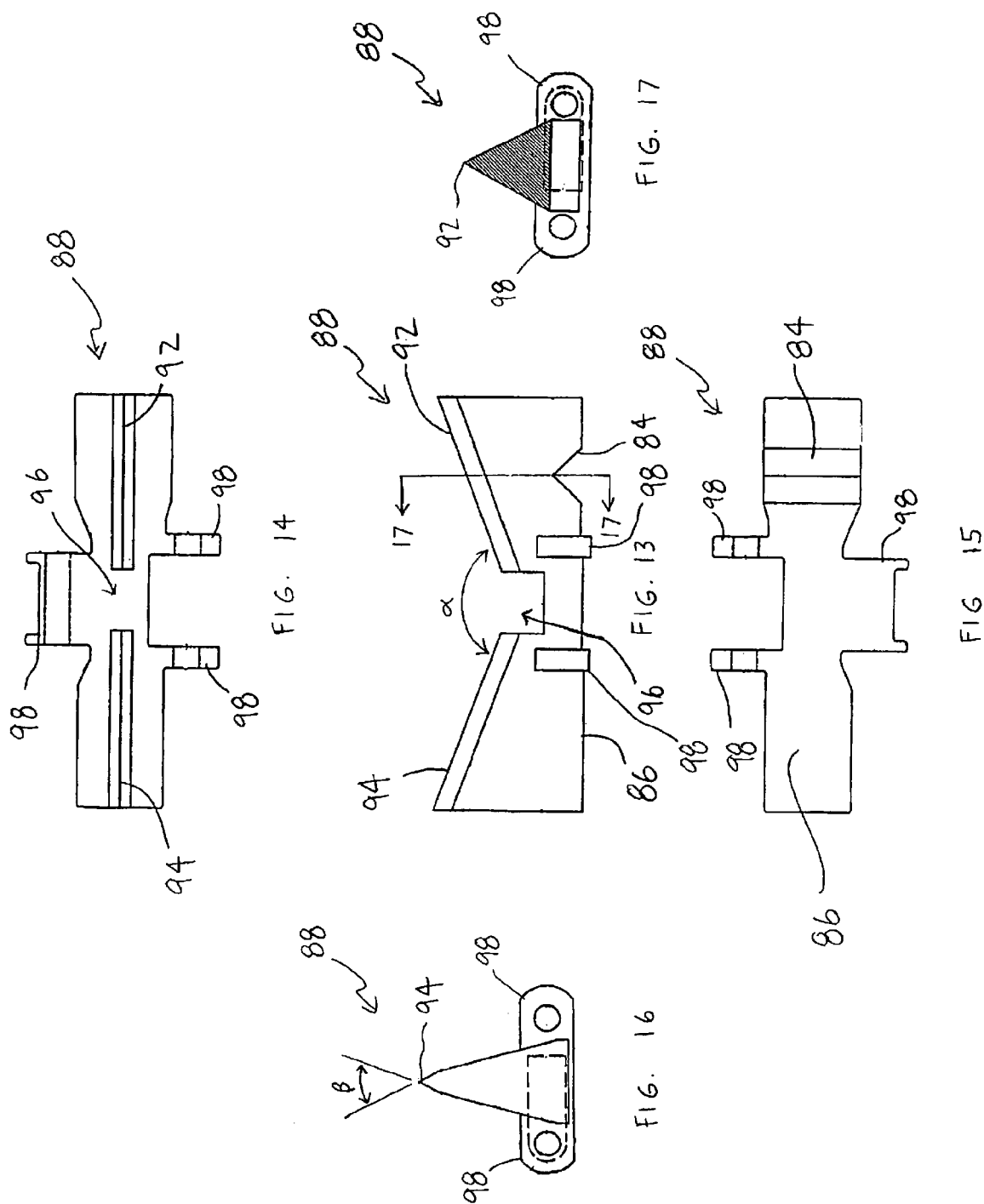

LOG TRANSPORT SYSTEM

BACKGROUND OF THE INVENTION

1) Field of the Invention

The present invention relates to log transport systems and, more particularly, relates to a system and method for transporting logs in a direction of motion while preventing appreciable unwanted motion, such as in directions transverse to the direction of motion, to thereby facilitate processing of the logs, such as by scanning, cutting, and the like.

2) Description of Related Art

During the processing of tree logs, long sections of logs are often transported for a variety of processing steps. For example, according to one conventional process, tree length logs, or "stems," are transported lineally on a motor-driven chain or belt drive mechanism supported by tracks formed of track sections that are welded or bolted together. The logs are passed by or through a scanning device, such as an optical scanner, that detects the size and shape of the log. This information is sent to an optimizing device that determines how each log should be cut, or "bucked," to best yield useful lumber. The logs are then transported by the drive mechanism to a saw that cuts the logs accordingly, for example, by transporting the log against a mechanical stop that hold the log in place and moving the saw transversely to cut the log.

Each log is typically non-uniform along its length, i.e., the log varies in cross-sectional size or shape or defines curves or other non-uniformities. As a result, the belt and chain drive mechanisms may not support the logs evenly, and the logs may therefore move relative to the mechanism in a rocking, bouncing, or sliding motion. Additionally, conventional systems can introduce a certain amount of unwanted motion while transporting the logs, for example, if the track sections are not uniform or not aligned correctly or if the drive mechanism does not move at a uniform speed. The unwanted motion of the logs can adversely affect the accuracy of the scanning or other processing, resulting in sub-optimal processing of the logs.

One prior art method of transporting the logs while reducing unwanted motion is to support the logs on two parallel chains, which can be connected by cross members. The chains are then driven separately or together by motors to lineally transport the logs. This dual-chain system provides better support for the logs, but the chains typically wear and stretch at different rates. If the chains are driven by a single motor, the uneven stretching and wearing can increase the stress on the chains and cross members and decrease the performance of the system. If the chains are driven by separate drive mechanisms, the uneven wearing and stretching of the chains can result in different speeds of the chains, thus imparting additional, nonlinear motion to the logs, adversely affecting other processes such as scanning.

According to another prior art transporting system, the logs are supported by holders spaced incrementally along the length of a single chain. The holders and chain are supported by a track formed of welded or bolted track sections. Each holder defines a stepped slot parallel to the chain for receiving the log. Each stepped slot defines a pair of steps or terraces that extend upwardly in a divergent manner. Logs of different diameters can be received by the slot and supported by the steps. Undesirably, however, the holders may not prevent the logs from sliding in a direction parallel to the chain, for example, while the chain is being started or stopped. Also, even if the holders move at a constant speed, nonuniformities in the track can cause unwanted motion, as described above.

Thus, there exists a need for a log transport system that supports the logs for lineal transport and substantially prevents rocking, bouncing, and sliding of the logs. The system should be capable of transporting logs of various lengths, cross-sectional sizes, and shapes, including logs that are non-uniform along their length. The system should also be compatible with other processes so that the log can be transported for scanning, cutting, and the like.

BRIEF SUMMARY OF THE INVENTION

In accordance with one aspect, the present invention satisfies these and other needs by providing a log transport system, log-carrying lugs therefor, and an associated method of transporting logs. In accordance with one aspect of the present invention, the system includes track(s) that are machined and connected to a frame, and key features keep the frame and track(s) in close alignment to provide substantially continuous and uniform track surfaces. Preferably, lugs with support surfaces that correspond to the track surfaces are configured to support the logs as the lugs are slid longitudinally along the tracks. Thus, the system transports the logs without substantial unwanted transverse motion.

According to one embodiment, the present invention provides a system for transporting a log, including first and second parallel tracks that extend longitudinally. Each of the tracks is formed of track portions, or sections, arranged collinearly to define first and second track surfaces respectively. The first track surface is machined to have a nonlinear cross section, and the second track has a linear surface that extends transversely, or perpendicular to the longitudinal direction of the tracks. The tracks are supported by a frame, and each of the first track portions and the frame define key features, such as keyways that receive keys, for positioning the first track portions relative to the frame so that the first track portions are substantially collinear and the first track surface is uniform and continuous in the longitudinal direction of the track to reduce transverse motion of the log during transport. The key features can extend across interfaces between collinear adjacent portions of the frame to maintain the successive frame portions in alignment.

In accordance with one aspect of the present invention, a plurality of lugs are adapted for supporting the log, each lug extending between the first and second tracks and defining first and second support surfaces that correspond in shape to the first and second track surfaces. For example, the support surfaces can be machined to correspond to the respective track surfaces so that the lugs slide longitudinally along the tracks. The lugs are preferably connected by a plurality of chain links, and configured to be slid along the tracks by a drive device, thereby transporting the log. Replaceable wear strips formed of a low friction material can be disposed between the support surfaces and the track surfaces. The system can also include a scanning device for determining dimensions of the log and a cutting device for transversely cutting the log.

The key features can include a plurality of projections that extend from the frame or track portions and corresponding cavities defined by the other of the frame or track portions. The projections and corresponding cavities can each be prismatically shaped. For example, each projection can be a rectangular prism, which defines four upright perpendicular surfaces that correspond to a respective rectangular cavity and restrict the track portion from moving horizontally in both the longitudinal direction and a lateral direction perpendicular to the longitudinal direction. The key features, for example, the projections and cavities, can be arranged to coincide with interfaces between adjacent track portions so that the ends of the track portions are kept in alignment. Additionally, the track portions can be arranged to overlap interfaces between portions of the frame so that the interfaces between adjacent track portions do not coincide with interfaces between the frame portions. Further, the cavities can extend only partially into the frame or track so that the projection does not extend through the frame and track and the key feature is encapsulated within the combination of the frame and track.

In accordance with one aspect, the present invention also provides a lug for transporting a log. The lug includes opposite first and second portions defining first and second lower surfaces respectively for engaging first and second tracks. The first and second portions also define upper first and second edges opposite the first and second surfaces, which are configured to engage the log (or which may be equipped with spikes for engaging the log). A connection portion extends between the first and second portions and is configured to engage a drive device (e.g., teeth of a motor-driven sprocket). The connection portion can define at least part of a link of a chain so that a plurality of the lugs can be connected/incorporated into an endless conveyor chain. The first and second edges preferably define an angled space therebetween for receiving the log.

According to one aspect of the invention, the lower first and/or second surfaces of the lugs define a contour (e.g., a ridge and/or groove) that corresponds to a track contour (e.g., a ridge and/or groove) extending along the respective track so that the respective lower surface of the lugs can be engaged to the respective track to substantially prevent the lug from being pivoted or translated transversely. For example, one of the surfaces of the lug can define a v-shaped slot that receives/mates with a v-shaped contour of the respective track. The mating surfaces can be at least partially defined by a wear strip that is removable and replaceable.

One aspect of the present invention is the provision of methods of constructing a log transport system, and one exemplary method is described in this paragraph. The method includes providing a plurality of frame portions that define a plurality of key features, machining a plurality of first track portions to define a first track surface and at least one key feature, the first track surface preferably having a nonlinear cross section that is uniform in a longitudinal direction of each track portion, and machining a plurality of second track portions to define a second track surface. A plurality of lugs are formed for supporting the log, each lug defining lower first and second support surfaces corresponding in shape to the respective track surfaces. For example, the first track surface can be machined to define a v-shaped contour, and the lugs can be machined so that one of the support surfaces corresponds thereto. Knife edges or spikes can be provided on upper portions of the lugs to engage the log and substantially prevent the log from moving relative to the lugs. The frame portions are positioned to define a frame extending in a longitudinal direction and having a frame surface. The key features of the first track portions are engaged to the key features of the frame portions so that the track portions define a first track, the first track extending longitudinally and preferably being substantially straight and uniform in shape in the longitudinal direction. For example, the key features can include slots formed in the frame portions and the first track portions, the slots of the frame portions can be respectively adjacent slots of the first track portions, and keys (e.g., blocks) can be respectively inserted into the adjacent slots to engage the first track portions to the frame portions. Key features can also be provided at adjacent ends of the frame portions, and the key features at interfaces of the adjacent ends can be aligned and overlapped with the first track portions. The second track portions are connected to the frame so that the second track portions define a second track extending parallel to the first track. The lugs are configured to extend between the first and second tracks so that the lower support surfaces of the lugs respectively engage the track surfaces. The lugs are also connected to a drive device that is configured to slide the lugs along the tracks in the longitudinal direction. According to one aspect of the invention, replaceable wear strips formed of a low friction material are disposed between the support surfaces of the lugs and the track surfaces. Scanning and/or cutting devices can be provided for determining dimensions of the log and transversely cutting the log.

BRIEF DESCRIPTION OF THE SEVERAL VIEWS OF THE DRAWINGS

Figure 1:
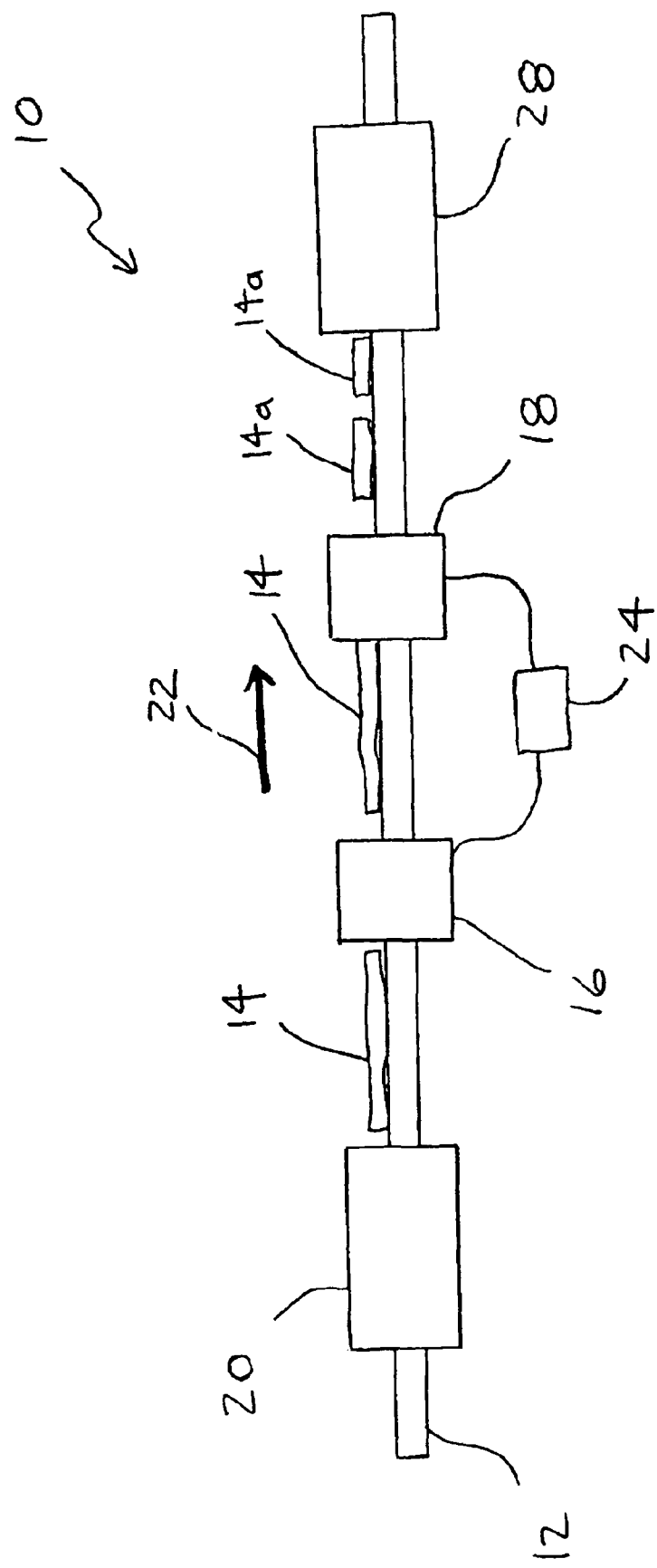
Figure 6:
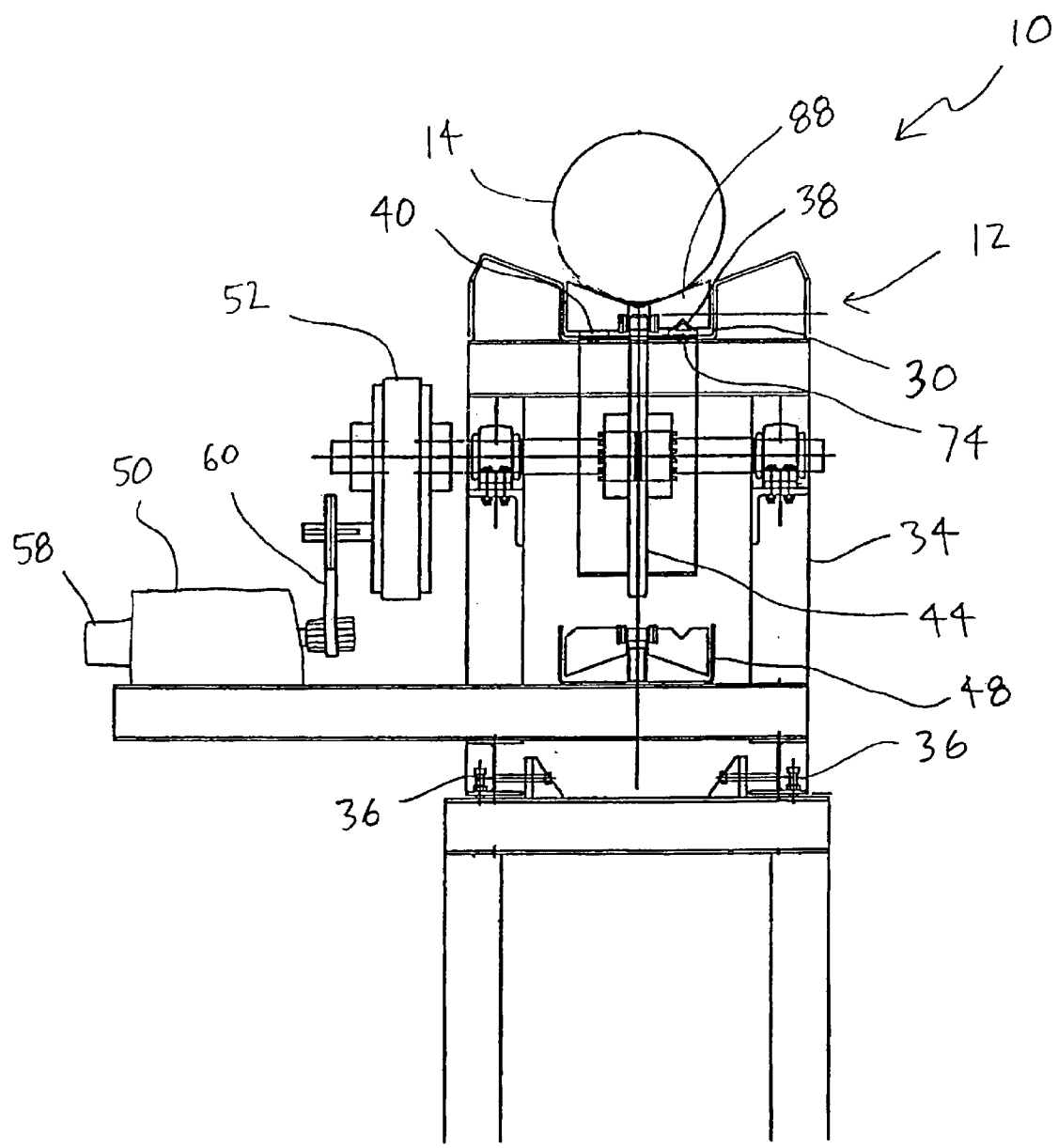
Figure 9:
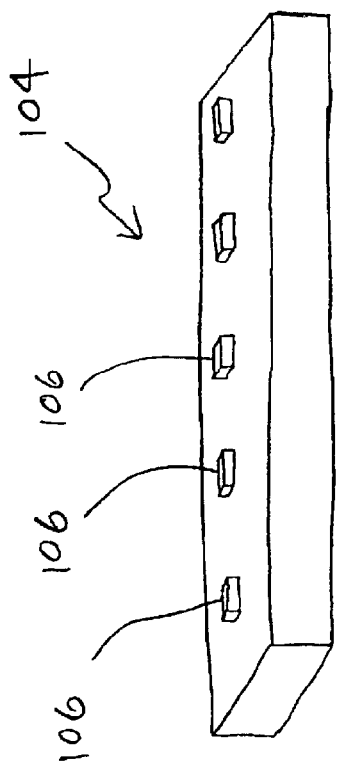
Figure 10:
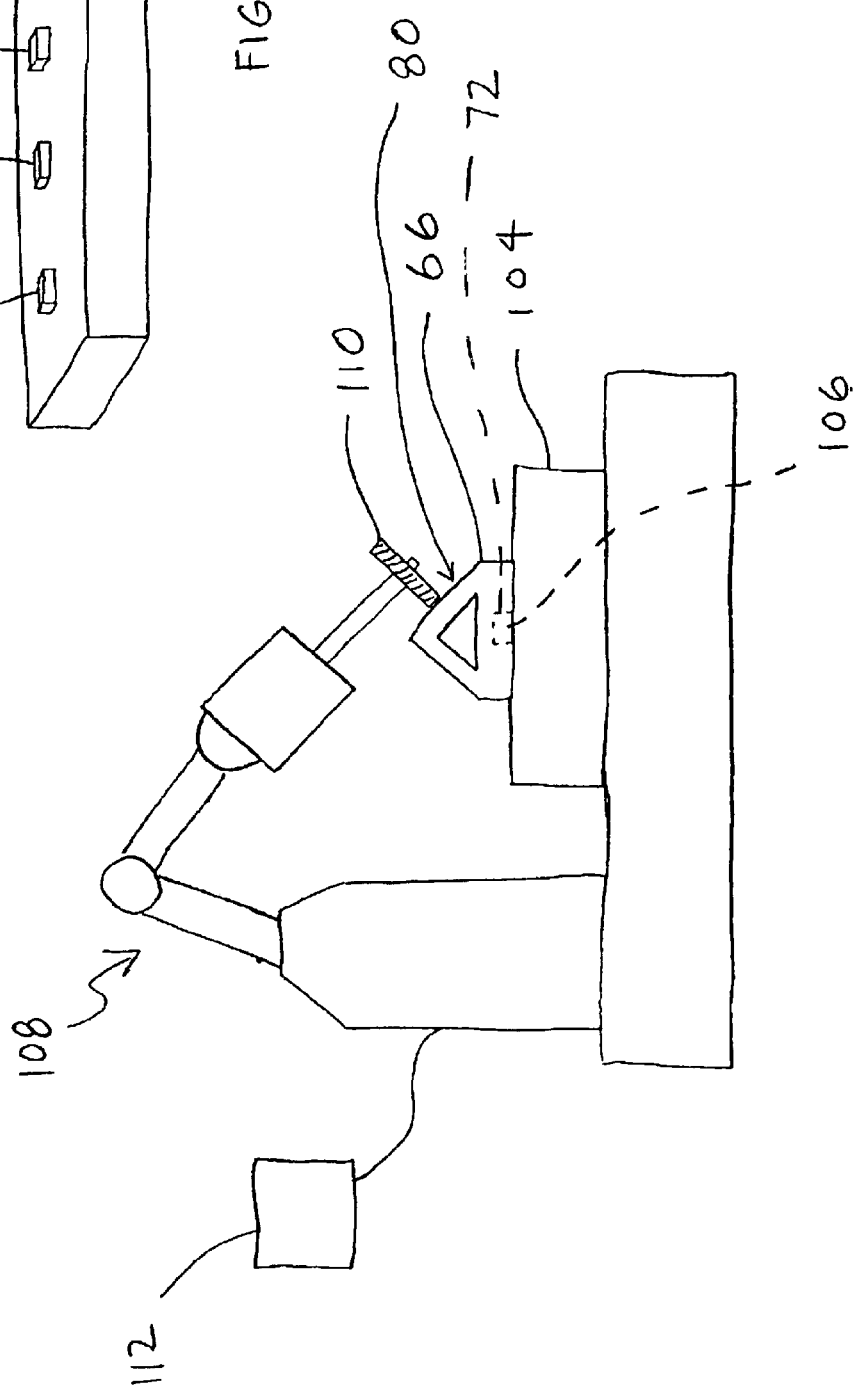
Figure 11:
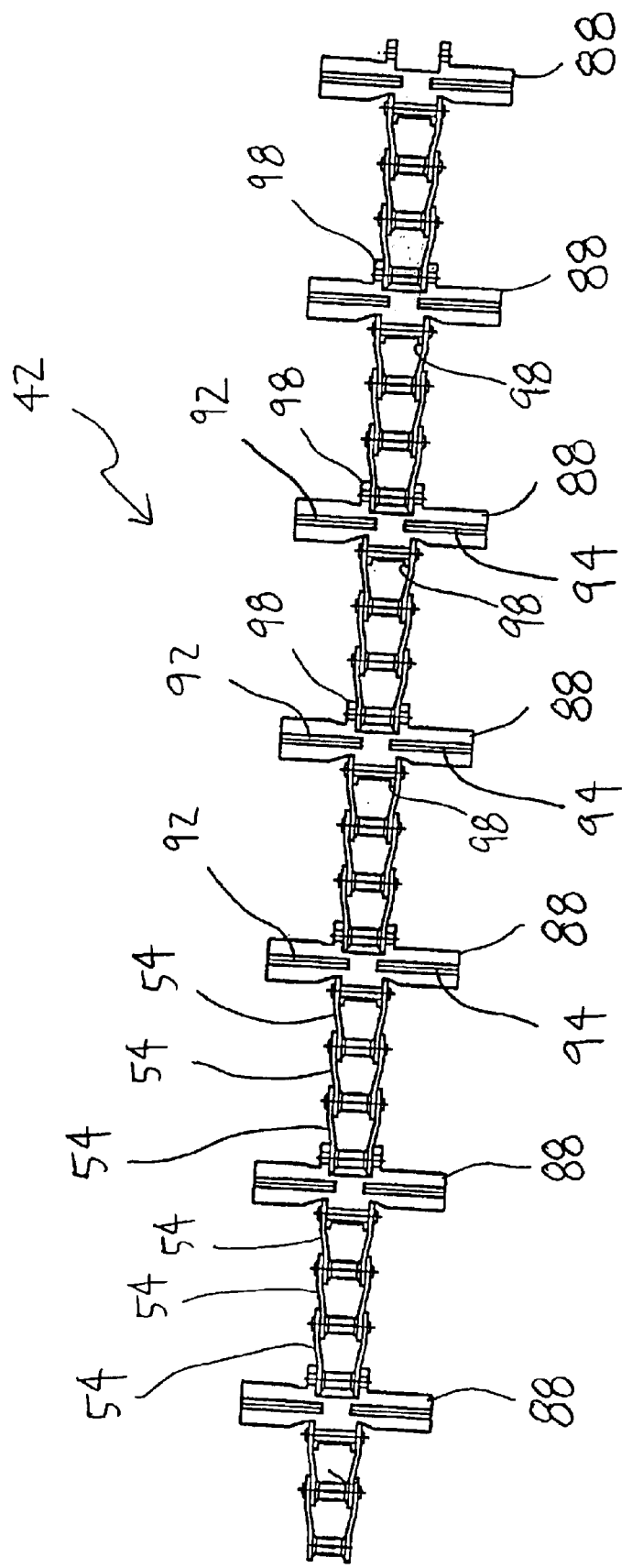
Figure 12:
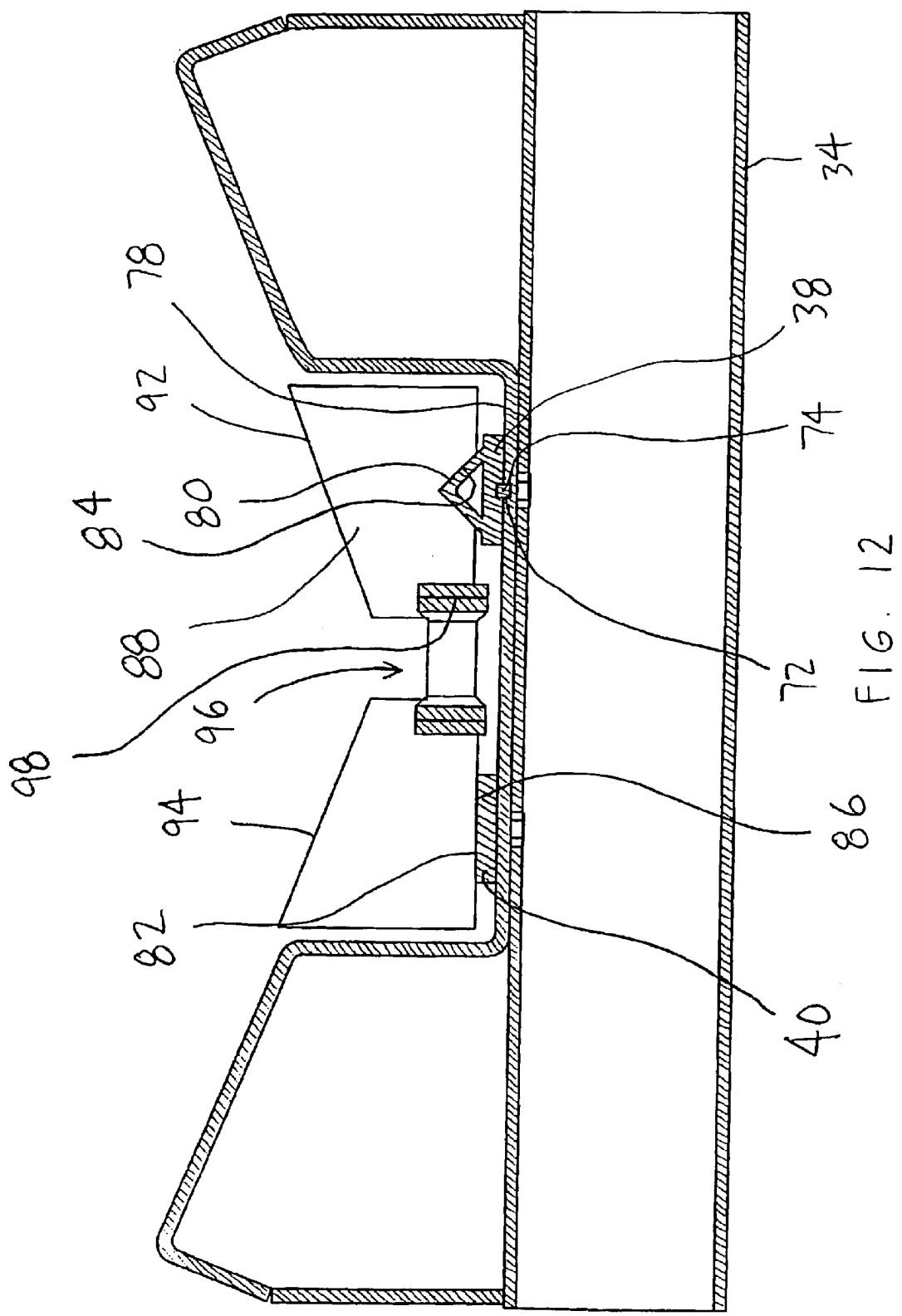
Figure 18:
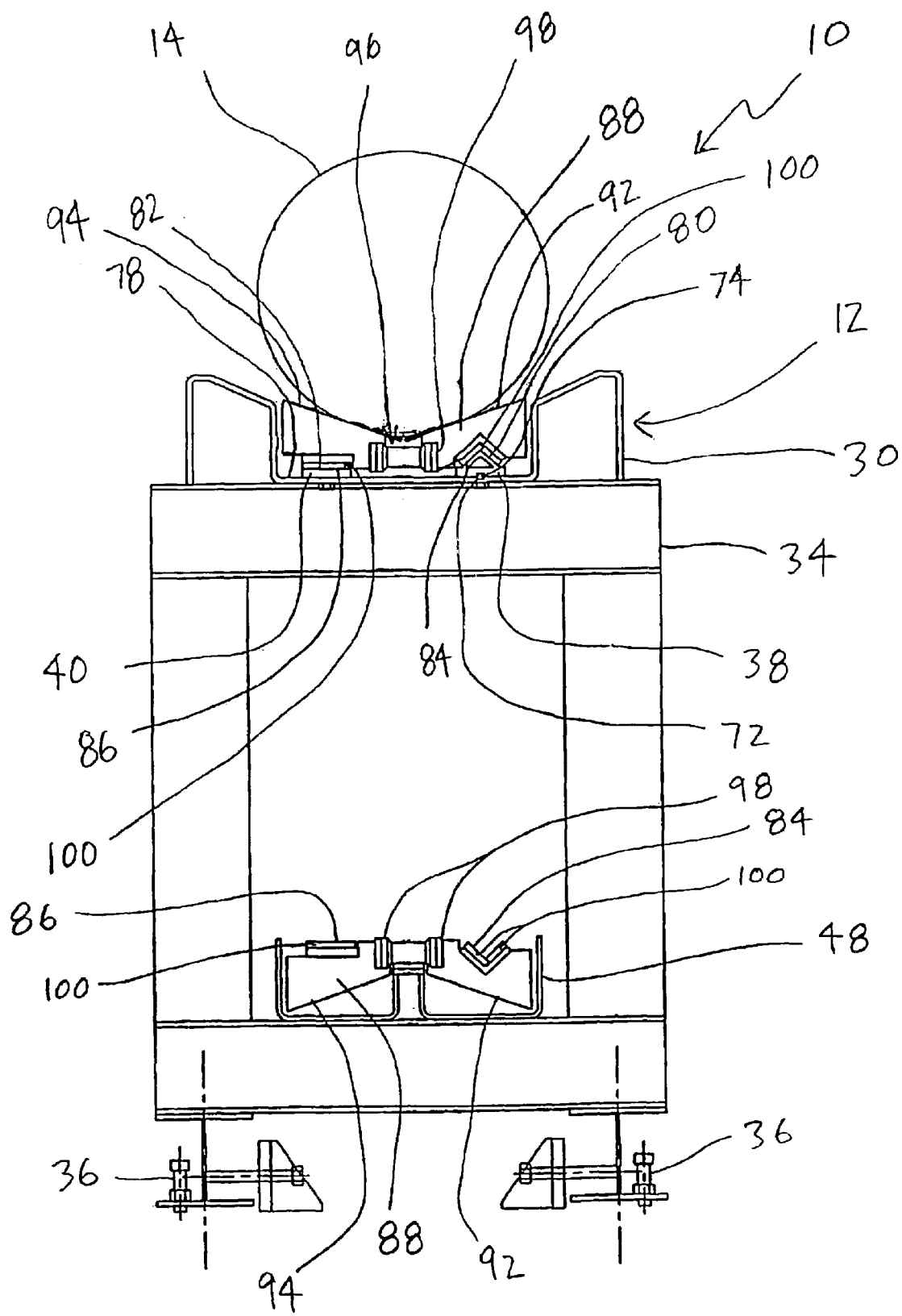
Figure 19:
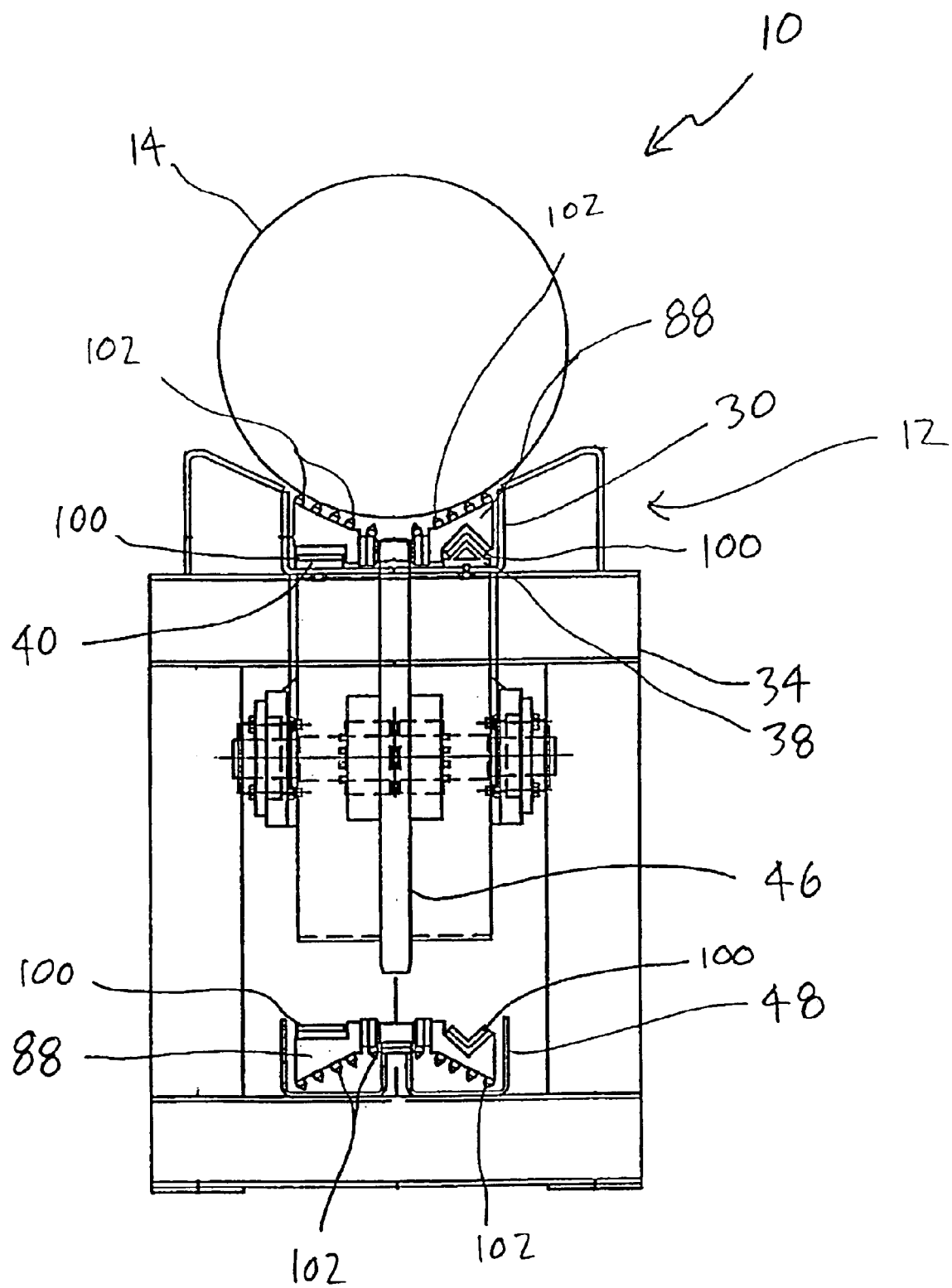

Having thus described the invention in general terms, reference will now be made to the accompanying drawings, which are all schematic and not necessarily drawn to scale, and wherein:

FIG. 1 is a side view of a log transport system according to one embodiment of the present invention;

FIG. 2 is a fragmentary top plan view of the transport system of FIG. 1;

FIG. 3 is a fragmentary elevation view of the transport system corresponding to FIG. 2;

FIG. 4 a partial plan view of the transport system of FIG. 1;

FIG. 5 is a partial elevation view of the transport system of FIG. 1;

FIG. 6 is an end view of the transport system of FIG. 1, shown in elevation as seen from the right side of FIG. 3;

FIG. 7 is an exploded plan view illustrating part of two frame portions with three keyways, three keys, and part of a first track portion, shown in an unassembled configuration;

FIG. 8 is a section view as seen along line 8—8 of FIG. 7;

FIG. 9 is a perspective view of a jig according to one embodiment of the present invention;

FIG. 10 is an elevation view of a first track portion configured on the jig of FIG. 9 and schematically showing a computer numeric control machine for machining the first track surface;

FIG. 11 is a partial plan view of a chain with lugs for engaging logs according to one embodiment of the present invention;

FIG. 12 is a partial section view of the transport system of FIG. 1 as seen along line 12—12 of FIG. 5;

FIG. 13 is an elevation view of a lug for engaging logs according to one embodiment of the present invention;

FIG. 14 is a top plan view of the lug of FIG. 13;

FIG. 15 is a bottom view of the lug of FIG. 13;

FIG. 16 is a side view of the left side of the lug of FIG. 13;

FIG. 17 is a section view of the lug of FIG. 13 as seen along line 17—17 of FIG. 13;

FIG. 18 is a section view of a transport system according to another embodiment of the present invention having replaceable wear strips; and FIG. 19 is an end view of a transport system according to yet another embodiment of the present invention having spikes disposed on the lugs.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, to FIG. 1, there is illustrated a log transport system 10 according to one embodiment of the present invention. The log transport 10 system includes a conveyor 12 for transporting the logs 14 through or past one or more processing devices, such as a computerized scanning device 16 and a cutting device 18. For example, a loading device 20 can first load the logs 14 onto the conveyor 12. The loader 20 can load the logs 14 individually in a transverse direction (into the page in FIG. 1) from a table (not shown) to the conveyor 12. The conveyor 12 typically transports the logs 14 in a longitudinal direction, indicated generally by reference numeral 22. As each log 14 passes through the scanning device 16, the scanning device 16 detects physical characteristics of the log 14 such as the length and profile. For example, the scanning device 16 can be an optical scanner, such as a laser scanner, that detects the cross-sectional size and shape of each log 14 along its length, thereby detecting any curves, voids, or other non-uniformities in the log 14. The scanning device 16 preferably generates scan data for each log 14, and the scan data is communicated to a processing device 24, which can determine an optimal manner of cutting the log 14 to generate products including lumber and chips. The processing device 24 can determine the optimal manner of cutting the log 14 based on such factors as the size and shape of the log, non-uniformities in the log 14, current pricing information for the possible products to be generated from the log 14, and the like as is known in the art. The conveyor 12 transports the log 14 longitudinally through the cutting device 18, where the log 14 is cut transversely according to the optimal manner determined by the processing device 24. The cut pieces 14a derived from the log 14 can be unloaded from the conveyor 12 by an unloader 28. Although the logs 14 are transported longitudinally along a single direction of motion through the system illustrated in FIG. 1, the logs 14 can alternatively be transported by multiple transport systems, some of which may transport the logs 14 in different directions. Those of ordinary skill in the art will know that nothing described about the present invention in this paragraph is novel per se. That is, everything described about the present invention in this paragraph is well known to those of ordinary skill in the art.

As shown in FIGS. 2–5, the conveyor 12 includes a frame 30, which is formed of a plurality of frame portions 32 that are supported by a support assembly 34. The support assembly 34 can be an assembly or framework of structural members, such as steel beams, on which the frame 30 is supported. The support assembly 34 can include one or more jacking bolts 36 for adjusting the assembly 34 to provide a continuous and straight structure for supporting the frame 30. The frame 30 preferably supports first and second tracks 38, 40 that extend longitudinally along the conveyor 12. The tracks 38, 40 preferably are parallel and define a space therebetween for a drive member. For example, the drive member can be an endless or continuous chain 42 formed of a series of links and extending between sprockets 44, 46 configured at opposed ends of the conveyor 12. In FIG. 3, the portion of the chain 42 disposed above the frame 30, i.e., the upper run in FIG. 3, is driven in the direction 22 of motion of the logs 14. The portion of the chain 42 disposed below the frame 30, i.e., the return portion of the chain 42 or the lower run in FIG. 3, travels in the opposite direction. The return portion of the chain 42 can be supported by a chain return race 48, which can be specially shaped to support the chain 42.

At least one of the sprockets 44, 46 is configured to be rotated, for example, by an electric motor 50 or other driving device, which can be connected to the sprocket 44, 46 through a gearing device such as a reduction gearbox 52. The motor 50 and gearbox 52 can be configured to move the chain 42, and hence the logs 14, at speeds as high as 500 to 900 feet per minute. The sprockets 44, 46 can be relatively large so that a uniform rotational speed of the sprockets 44, 46 results in a nearly uniform speed of the chain 42. That is, despite speed variations of the chain 42 that result from the movement of links 54 of the chain 42 against the sprocket 44, 46, so called "chordal action" of the chain 42 on the sprockets 44, 46, the chain 42 moves at a nearly uniform speed. For example, the sprockets 44, 46 can have a circumference of about twenty times the length of each link 54. Preferably, at least one of the sprockets 44, 46 is biased outward by a tension device 56 to apply tension to the chain 42. The tension device 56 can be a hydraulic cylinder that is connected to a pressure source. The pressure source can be pressurized at a relatively low pressure to avoid undue wear on the chain 42. A rotational encoder 58 can also be configured to detect the speed of the motor 50, sprockets 44, 46, or other system components and thereby calculate the speed of the chain 42 and the logs 14. Used in conjunction with the scanning device 16 or another detector, such as a photocell, for detecting the ends of the logs 14 during transport, the rotational encoder 58 can also be used to determine the length of the logs 14 and the position of the logs 14 on the chain 42 during processing, for example, to accurately position the logs 14 during cutting.

The conveyor 12 can be used to transport the logs 14 and position the logs 14 throughout the system 10. For example, the logs 14 can be positioned and stopped proximate to the cutting device 18 so that the cutting device 18 can remove a small portion of the end of the log 14, sometimes referred to as a "lily pad," and the cutting device 18 can be used to cut the logs 14 accurately into the shorter pieces 14a uniformly or according to instructions from the processing device 24. In order to facilitate accurate positioning of the logs 14 on the conveyor 12, mechanical slack can be reduced so that the logs 14 move consistently with the chain 42 during transport, i.e., the logs 14 do not move substantially relative to the chain 42, and so that the logs 14 and chain 42 move directly proportionately with the motor 50. Mechanical slack can be reduced by eliminating slippage between the motor 50 and the chain 42 by connecting the motor 50, the gearbox 52, and the sprockets 44, 46 with timing belts, chains, or shafts. For example, the motor 50 and the gearbox 52 can be connected by a timing belt 60, and a shaft connection can be provided between the gearbox 52 and the sprockets 44. Shaft mounted components, such as the sprockets 44, 46, can be mounted using keyless hubs, which prevent looseness or play in the connection therebetween. Further, torque arms (not shown), used to connect the gearbox 52 to the support assembly 34 or the motor 50, can be provided with a stiff damper that prevents substantial movement of the gearbox 52.

Those of ordinary skill in the art will know that nothing described about the present invention in the foregoing portion of the Detailed Description of the Invention section of the present application is novel per se. Nonetheless, preferably, but not necessarily, at least some of the features described in the foregoing portion of the Detailed Description of the Invention section of the present application are used with features of the present invention that are described hereinafter, so that the resulting accuracy of the conveyor 12 is improved by substantially preventing unwanted motion of the logs 14. For example, the present invention can be used to minimize rocking, bouncing, or sliding of the logs during transport. Further, the logs can be accurately positioned longitudinally such that lily pads as thin as 0.1 inches can be cut from the logs and the logs can otherwise be cut at accuracies of 0.1 inches or less, reducing wasted material and accurately cutting the logs 14 into the pieces 14a according to the predetermined optimal manner.

Although the frame portions 32 can be provided in any length, long conveyors 12 are preferably built by assembling a plurality of shorter frame portions 32 as shown in FIGS. 2 and 3. For example, the frame portions 32 preferably are manufactured in lengths of about 20 feet, and conveyors 12 longer than 20 feet can be built by assembling two or more frame portions 32 in an end-to-end series. Similarly, each of the tracks 38, 40 preferably are formed of shorter track portions 64, 66 that are collinearly configured and supported by the frame 30. That is, the track portions 64, 66 are arranged end-to-end in series. Preferably, the track portions 64, 66 are arranged in a staggered configuration relative to the frame portions 32 so that the track portions 64, 66 overlap interfaces 68 between abutting or adjacent frame portions 32, i.e., the interfaces 68 between the frame portions 32 are disposed at longitudinally offset positions and are not coincident with interfaces 70 between adjacent track portions 64, 66. For example, if frame portions 32 that are 20 feet in length are used to form the frame 30, track portions 32 in 5 feet lengths can be provided at the ends of the conveyor 12 and 10 feet lengths therebetween, as shown in FIGS. 2 and 4.

As shown in FIGS. 4 and 6, a plurality of key features are provided for aligning the frame portions 32 and the first track portions 64. It is noted that the key features, although actually hidden from view by the first track 38, are shown in FIG. 4 for the purpose of illustrative clarity. At least one of the key features preferably is provided at each interface 68, 70 of the frame and first track portions 32, 64. For example, the key features can be corresponding keyways 72, or slots, that are provided in the frame portions 32 and the first track portions 64, each keyway 72 being configured to receive a key 74 that corresponds in shape to the keyways 72. Each of the keyways 72 is preferably a cavity having only one opening, with the one opening being sized just slightly larger than the key 74 received thereby. For example, each key 74 can have a square cross section measuring approximately ½ inch by ½ inch and a length of approximately 3 inches extending in the longitudinal direction of the track 38, 40. Each side of the keys 74 can be a planar surface. In FIGS. 7 and 8, the frame portion 32, keys 74, and first track portion 64 are shown in an unassembled configuration for the purpose of illustrative clarity, and the first track portion 64 is shown rotated 180 degrees from its normal assembled orientation. As shown in FIGS. 7 and 8, the keys 74 can be prismatic in shape, for example, rectangular prisms, and each of the keyways 72 in the frame and first track portions 32, 64 can correspond to part of the respective key 74 so that each key 74 is partially received by each of the frame and first track portions 32, 64. That is, the keyways 72 can be rectangular cavities structured to receive the keys 74. The keys 74 can be positioned in either of the frame or first track portions 32, 64 to define a predetermined pattern of prismatic projections therefrom that can be received by the keyways 72 or cavities defined by the other of the frame or first track portions 32, 64.

Alternatively, other key features can be provided, such as corresponding notches, steps, ribs, or other features. For example, the keys 74 can be formed as an integral part of the frame or first track portions 32, 64. Further, the keys 74 and keyways 72 can define other shapes such as a cylinder or cube. Additionally, the keyways 72 can be provided at other locations such as the interfaces 70 of the second track portions 66.

The keys 74 align the frame portions 32 with the first track portions 64. The keyways 72 can extend across the interfaces 68 of the frame portions 32 and the interfaces 70 of the first track portions 64 so that the keys 74 therein align the ends of each portion 32, 64 to correspond with the respective end of the adjacent portion 32, 64. Thus, the key features align the frame and first track portions 32, 64 and prevent the first track portions 64 from moving longitudinally or transversely relative to the frame portions 32, thereby providing a smooth, continuous first track surface 80. Where the tracks 38, 40 are configured to extend horizontally, the key features prevent horizontal movement between the first track 38 and the frame 30 in both the longitudinal direction 22 and a lateral direction perpendicular to the longitudinal direction 22. The key features preferably do not substantially restrict vertical movement between the track 38 and the frame 30, but bolts 77 or other fastening elements or devices are preferably provided for such vertical restraint. For example, the bolts 77 can extend through the frame portions 32 as shown in FIGS. 7 and 8, and can extend into or through the first track portions 64. Bolts can similarly be used to connect the second track portions 66 to the frame portions 32. Alternatively, other fastening devices, weld joints, and the like can be used to join the frame and track portions 32, 64, 66.

During assembly of the transport system 10, the frame and first track portions 32, 64 are configured as shown in FIGS. 2-6 with the keys 74 disposed in the keyways 72. For example, according to one typical method of assembly, the keys 74 are inserted into the keyways 72 of the frame portions 32, and keyways of the first track portions 64 are respectively positioned over the keys such that the keys are respectively encapsulated in the keyways, as shown in FIG. 12. Bolts (not shown) can be received by bolt holes 76, or other fastening features can be provided in the frame and track portions 32, 64, 66, for holding the first and second track portions 64, 66 in place against the frame portions 32, thereby holding each of the frame portions 32 and track portions 64, 66 in alignment and maintaining the first track surface 80 and a second track surface defined by the second track portions 66.

In a manner similar to the key features, the bolt holes 76 are shown in FIG. 4 for the purpose of illustrative clarity, though the holes 76 would actually be hidden from view by the second track surface 82. The bolts can extend through the frame portions 32 and into or through the track portions 64, 66. If the bolts extend through the track portions 64, 66, the bolts can be recessed in track surfaces 80, 82. Therefore, the key features can facilitate the alignment of the frame 32 and track portions 64, and bolts, rivets, weld joints, or other connections can then be used to join the portions 32, 64, 66 in the desired configuration. Advantageously, the key features facilitate accurate assembly of the transport system 10. For example, the frame and track portions 32, 64, 66 can be manufactured in relatively short lengths, as described above, and machined to precise specifications. Thereafter, the portions 32, 64, 66 can be delivered to the site where the system 10 is to be assembled, and assembled so that the tracks 38, 40 are continuous and uniform along their length.

The frame portions 32, which can be trough shaped as shown in FIG. 6, can be formed by bending a stock piece of material, such as steel, and machining the material so that the frame portions 32 define a continuous surface 78 for supporting the track portions 64, 66. Similarly, the track portions 64, 66 are preferably machined to define the first and second track surfaces 80, 82 thereon. The key features can also be machined, and a fixture or jig 104 (FIGS. 9 and 10) that corresponds to the key features or other aspects of the frame and track portions 32, 64, 66 can be used to position the portions 32, 64, 66 while the surfaces 78, 80, 82 are machined. For example, the jig 104 shown in FIG. 9 defines a number of protrusions 106 or keys corresponding in size, shape, and orientation to the keys features of the frame and first track portions 32, 66. During manufacture, and after the keyways 72 are formed on the first track portions 66, each first track portion 66 can be secured to the jig 104 and a machining device, such as a computer numeric control (CNC) machine 108, can be used to machine the first track surface 80 as shown in FIG. 10, so that the first track surface 80 is configured relative to the key features as desired. The CNC machine 108 includes a machining tool 110 and a computer 112 for controlling the articulation and operation of the tool 110, as is known in the art. Alternatively, the jig 104 can define keyways instead of the protrusions 106, and the keys 74 can be inserted into the keyways and used to secure the first track portions 66 to the jig 104 during the machining process.

The first and second track surfaces 80, 82, which are parallel and extend longitudinally, are configured to correspond to first and second support surfaces 84, 86, (FIGS. 12 and 13) respectively, of log-carrying lugs 88 that slide thereon. According to one embodiment of the present invention, the first track surface 80 defines a nonlinear cross section that is uniform in the longitudinal direction 22 of the tracks 38, 40, and the second track surface 82 defines a linear cross section that is also uniform in the longitudinal direction 22. For example, each first track portion 66 can define a ridge that extends from a base of the portion 66, so that the first track surface 80 defines a contour, such as a v-shaped contour, and the second track surface 82 can define a flat surface which extends perpendicular to the longitudinal direction 22, as shown in FIG. 6. The ridges or contours of the first track portions 66 are aligned when the key features are engaged to form a composite ridge defining the first track surface 80, which is substantially uniform between the ends of the track 38. Thus, each lug 88 can slide longitudinally along the track surfaces 80, 82, and the first track surface 80 keeps the lugs 88 aligned with the tracks 38, 40.

The lugs 88 are attached to the drive member, e.g., the chain 42, and can form part of the drive member. For example, as shown in FIG. 11, the chain 42 is formed of a plurality of the links 54, and each lug 88 is adapted to be disposed in the chain 42 between two links 54. Thus, the lugs 88 can be links of the chain 42. The lugs 88 can be designed to engage teeth 90 on the sprockets 44, 46, or the sprockets 44, 46 can be provided with fewer teeth 90 with spaces therebetween so that the teeth 90 on each sprocket 44, 46 engage only every other link 54 of the chain 42. The chain 42 can be positioned on the sprockets 44, 46 so that the teeth 90 engage links 54 between each lug 88 and the lugs 88 fit between the teeth 90 while rotating around the sprockets 44, 46.

Referring to FIG. 12 and FIG. 2, the first and second support surfaces 84, 86 of the lugs 88 in the upper run of the chain 42 engage the first and second track surfaces 80, 82, and the links 54 of the chain 42 are disposed between the tracks 38, 40 and preferably do not contact the frame 30 or the tracks 38, 40. For example, the first support surface 84, defined by the base of each lug 88, can define a downwardly-open groove, such as a v-shaped slot, that extends in the longitudinal direction 22 and corresponds in shape to the first track surface 80. The second support surface 86 can define a flat surface to slide smoothly on the second track surface 82, and the links 54 can be disposed therebetween.

The lugs 88 define a receptacle or are otherwise configured to receive and support the logs 14 and transport the logs 14 in the longitudinal direction 22. According to one embodiment, illustrated in FIGS. 13-17, each lug 88 defines two sharp knife edges 92, 94 that define an angle $\alpha$ therebetween. The knife edges 92, 94 define a log-receiving space that is upwardly open and open in the longitudinal direction. The space between the knife edges 92, 94 decreases in size in the downward direction so that the knife edges 92, 94 engage the log 14 to prevent the log 14 from slipping or otherwise moving relative to the lugs 88. The angle $\alpha$ is structured to receive logs 14 of a variety of sizes and shapes. For example, the angle $\alpha$ can be between about 120 and 160 degrees. Each knife edge 92, 94 further defines an angle $\beta$ between first and second sides of the lugs 88, and the angle $\beta$ can be adapted for the type of log 14, type of transporting, and the like, so that the knife edges 92, 94 sufficiently engage the logs 14 to prevent unwanted motion thereof. For example, in one advantageous embodiment, the angle $\beta$ is between about 50 and 70 degrees, such as about 60 degrees. Preferably, the log 14 is supported by the lugs 88 so that the log 14 does not contact the chain 42. The lugs 88 hold the log 14 away from chain 42, and a space 96 between the log 14 and the chain 42 facilitates scanning or other processing of the log 14.

The lugs 88 can be formed of a variety of materials, including metals such as different types of steel, which can be cast in the desired shape. Each lug 88 is then machined, for example, so that the support surfaces 84, 86 of the lugs 88 correspond closely in shape to the track surfaces 80, 82. Other portions of the lugs 88 can also be machined to correspond closely to predetermined specifications including the knife edges 92, 94, connection portions 98 for engaging the adjacent links 54 of the chain 42, and the like.

The track surfaces 80, 82 can be formed of a strong material that is corrosion and wear resistant such as stainless steel. Additionally, as shown in FIG. 18, wear strips 100 can be disposed between the track surfaces 80, 82 and the support surfaces 84, 86 of the lugs 88. For example, the wear strips 100 can be attached to the support surfaces 84, 86 by adhesives, fasteners such as rivets, bolts, or clips, and the like. According to one embodiment, the track surfaces 80, 82 are formed of stainless steel, which resists corrosion, and the wear strips 100 are formed of a low friction polymer, such as Nylatron®, a registered trademark of Polymer Corporation of Reading, Pa., or other low-friction materials. A replaceable, low friction material can also be provided on the track surfaces 80, 82. Alternatively, each of the track surfaces 80, 82 and support surfaces 84, 86 can be formed of stainless steel or another wear-resistant material.

Spikes 102 can also be provided on the lugs 88 to provide enhanced engagement of the lugs 88 to the logs 14, as shown in FIG. 19. The spikes 102 can enhance the prevention of movement of the logs 14 relative to the lugs 88, even when movement of the conveyor 12 is repeatedly started and stopped. Thus, the spikes 102 can be used for precise positioning of the logs 14, for example, when cutting the logs 14 with the cutting device 18. In some cases, the spikes 102 may prevent or make difficult the loading or unloading of the logs 14 in a transverse direction. Therefore, the logs 14 can be unloaded by advancing the logs 14 longitudinally off of the conveyor 12 and onto another device such as another conveyor. The logs 14 can also be loaded onto the conveyor 12 longitudinally, for example, from another conveyor that does not have spikes. In one embodiment, the logs 14 are loaded transversely onto a first conveyor that has lugs without spikes, advanced longitudinally onto a conveyor that has lugs with spikes, processed thereon, advanced longitudinally onto a conveyor that has lugs without spikes, and unloaded transversely therefrom.

The spikes 102 can be formed as an integral part of the lugs 88, or the spikes 102 can be attached to the lugs 88. For example, the lugs 88 can be formed by casting a metal, such as steel, in a mold or die. The spikes 102, which can be separately formed of a hard, wear resistant material such as carbide, can then be attached to the lugs 88, for example, by welding or otherwise attaching the spikes 102 to the lugs 88. If the spikes 102 become worn, the spikes 102 can be sharpened or removed from the lugs 88 and replaced.

Many modifications and other embodiments of the inventions set forth herein will come to mind to one skilled in the art to which these inventions pertain having the benefit of the teachings presented in the foregoing descriptions and the associated drawings. For example, the transport system 10 can include an automatic lubrication system for increasing the efficiency of the system 10 and reducing wear of the various components, as will be understood by a person of ordinary skill in the art. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for transporting a log, the system comprising:
   a first track extending in a longitudinal direction and defining a first track surface having a nonlinear cross section, said first track formed of a plurality of first track portions;
   a second track extending in the longitudinal direction and defining a second track surface that is spaced apart from said first track in a transverse direction perpendicular to the longitudinal direction;
   a frame extending in the longitudinal direction and supporting said first and second tracks in at least a generally parallel configuration;
   a plurality of log lugs adapted for supporting the log, each lug extending between said first and second tracks and defining a first support surface corresponding in shape to the first track surface and a second support surface corresponding in shape to the second track surface such that said lugs are configured to slide along said tracks in the longitudinal direction;
   a plurality of chain links connecting said lugs in series; and
   a drive device configured to move the lugs in the longitudinal direction to slide said lugs along said track surfaces and thereby transport the log in the longitudinal direction;
   wherein each track portion is machined to define a portion of the respective track surface and each first track portion and said frame define a plurality of key features located at predetermined configurations relative to said first track surface, each key feature providing a positioning device for positioning the first track portions relative to said frame such that said first track portions are substantially collinear and said first track surface is substantially uniform and continuous in the longitudinal direction of said track, thereby reducing transverse motion of the log during transport.

2. A system according to claim 1 wherein each of said first and second support surfaces of said lugs is machined to correspond to the respective track surface.

3. A system according to claim 1 wherein each key feature comprises a slot and a key, said slot partially defined by each of the frame and the respective first track portion and said key positioned in said slot to prevent longitudinal and lateral movement of the respective first track portion relative to said frame.

4. A system according to claim 1 wherein said frame is formed of a plurality of collinear frame portions in abutting contact at longitudinally successive interfaces therebetween, wherein for each interface at least one of said key features extends across said interface to maintain the successive frame portions in alignment.

5. A system according to claim 1 further comprising replaceable wear strips disposed between said support surfaces of said lugs and said track surfaces, said wear strips formed of a low friction material.

6. A system according to claim 1 wherein each lug defines first and second edges that are for contemporaneously engaging the log and define an angle therebetween of about 120 to 160 degrees so as to define a converging receptacle that receives the log.

7. A system according to claim 1 wherein said first track surface defines a v-shaped contour extending in the longitudinal direction and said first support surface defines a v-shaped slot corresponding in shape to said contour of said first track surface.

8. A system according to claim 1 wherein each lug defines a knife edge for engaging the log, wherein the knife edge is disposed at an angle relative to the longitudinal direction such that the knife edge is configured to engage the log and prevent the log from sliding in the longitudinal direction relative to the knife edge.

9. A system according to claim 1 further comprising a plurality of pointed spikes extending from said lugs, said spikes configured to engage the log and prevent the log from moving relative to said lugs.

10. A system according to claim 1 further comprising a scanning device configured to scan the log and determine dimensions of the log.

11. A system according to claim 1 further comprising a cutting device configured to cut the log in a direction transverse to the longitudinal direction.

12. A system according to claim 1 wherein each key feature comprises a key way in receipt of a key.

13. A method of constructing a log transport system, the method comprising:
   positioning frame portions to define a frame extending in a longitudinal direction and having a frame surface;
   engaging key features of first track portions respectively to key features of the frame portions such that the first track portions define a first track, the first track extending longitudinally and being substantially uniform in shape in the longitudinal direction;
   connecting second track portions to the frame such that the second track portions define a second track extending parallel to the first track; and connecting lugs for carrying logs to a drive device configured to slide the lugs along the tracks in the longitudinal direction.

14. A method according to claim 13 further comprising machining said first and second track portions to define first and second track surfaces respectively thereon.

15. A method according to claim 13 further comprising machining first and second support surfaces of each lug to correspond to the respective track surfaces.

16. A method according to claim 13 further comprising forming a slot in the frame portions and first track portions and wherein said engaging step comprises configuring the first track portions such that the slots in the first track portions correspond to the slots in the frame portions and inserting keys into the slots to engage the first track portions to the frame portions.

17. A method according to claim 13 further comprising forming a key feature in adjacent ends of the frame portions, wherein said positioning step comprises aligning the key features at interfaces of the adjacent ends of the frame portions, and said engaging step comprises overlapping the interfaces of the frame portions with the first track portions.

18. A method according to claim 13 further comprising disposing replaceable wear strips formed of a low friction material between the support surfaces of the lugs and the track surfaces.

19. A method according to claim 13 further comprising forming first and second edges of the lugs disposed at an angle of between about 120 and 160 degrees to at least partially receive the log therebetween.

20. A method according to claim 13 further comprising comprises machining the first track surface to define a v-shaped contour extending in the longitudinal direction of the track and forming a first support surface of the lugs to define a v-shaped slot corresponding in shape to the contour of the first track surface.

21. A method according to claim 13 further comprising forming a knife edge on each lug for engaging the log, wherein the knife edge is disposed at an angle relative to the longitudinal direction such that the knife edge is configured to engage the log and prevent the log from sliding in the longitudinal direction relative to the knife edge.

22. A method according to claim 13 further comprising forming a plurality of pointed spikes extending from the lugs, the spikes configured to engage the log and prevent the log from moving relative to the lug.

23. A method according to claim 13 further comprising providing a scanning device configured to scan the log and determine dimensions of the log.

24. A method according to claim 13 further comprising providing a cutting device configured to cut the log in a direction transverse to the longitudinal direction of said tracks.

25. A system for acting upon a log, the system comprising:
a substantially horizontally extending track mounted to a frame and extending in a longitudinal direction, with the track including a plurality of track sections that are arranged end-to-end in series and that each include a base and an upright ridge extending in the longitudinal direction, wherein at least one of the plurality of track sections and the frame includes a plurality of cavities, the other of the plurality of track sections and the frame includes a plurality of prismatic projections projecting therefrom, the cavities are respectively in receipt of the projections, and the cavities and the projections are arranged in a predetermined pattern and cooperative with one another so that while the cavities are respectively in receipt of the projections;
the upright ridges are arranged end-to-end and aligned with one another in a substantially straight line so that the upright ridges together form a composite upright ridge that includes opposite ends and the upright ridges between the opposite ends, with the composite upright ridge being substantially uniform between the opposite ends,
the cavities and the projections substantially restrict relative horizontal movement between the track and the frame in both the longitudinal direction and a lateral direction that is perpendicular to the longitudinal direction, and
the cavities and the projections do not substantially restrict relative vertical movement between the track and the frame;
an endless chain movably mounted on the frame so as to include a lower run and an upper run extending in the longitudinal direction; and
a motor for driving the chain so that the upper run of the chain travels in the longitudinal direction relative to the track and frame,
wherein the endless chain is formed from a plurality of links that are connected in series,
wherein at least some of the links each include a receptacle for receiving and supporting a section of the log while the receptacle is in the upper run, with each of the receptacles in the upper run defining a log-receiving space that is upwardly open, open in the longitudinal direction, and decreases in size in the downward direction, and
wherein at least some of the links each include a base, with each of the bases in the upper run defining a downwardly-Open groove extending in the longitudinal direction and respectively slidingly receiving the upright ridges of the track sections while the upper run travels in the longitudinal direction relative to the track and frame,
whereby at least the cavities, the projections, the upright ridges and the grooves cooperate to delimit movement of the log while the log is carried by the upper run of the chain.

26. A system according to claim 25, further comprising a plurality of fastening elements for fastening the track to the frame so as to substantially restrict relative vertical movement between the track and the frame.

27. A system according to claim 25, further comprising a scanner proximate to the upper run for determining how the log is shaped while the log is carried by the upper run.

28. A system according to claim 25, wherein the frame is formed of a plurality of frame sections that are arranged end-to-end in series and the track sections are arranged to overlap interfaces of adjacent frame sections such that interfaces of adjacent track sections are disposed at longitudinally offset positions from the interfaces of the frame sections.

29. A system according to claim 28, wherein the interfaces of the adjacent track sections are coincident with at least one of the projections and the respective cavity such that each pair of adjacent track sections cooperatively defines at least one of the projections and cavities.

30. A system according to claim 25, wherein the cavities extend only partially through the respective one of the frame and track sections and the projection extends only partially through the respective one of the frame and track section when received by the respective cavity such that the projections are encapsulated within the frame and track sections.

* * * * *